United States Patent
Reed et al.

(10) Patent No.: US 9,849,834 B2
(45) Date of Patent: Dec. 26, 2017

(54) SYSTEM AND METHOD FOR IMPROVING VEHICLE WRONG-WAY DETECTION

(71) Applicant: Ford Global Technologies, LLC, Dearborn, MI (US)

(72) Inventors: Eric L. Reed, Livonia, MI (US); Brian Bennie, Sterling Heights, MI (US); Thomas Lee Miller, Ann Arbor, MI (US)

(73) Assignee: Ford Gloabl Technologies, L.L.C., Dearborn, MI (US)

( * ) Notice: Subject to any disclaimer, the term of this patent is extended or adjusted under 35 U.S.C. 154(b) by 0 days.

(21) Appl. No.: 14/301,644

(22) Filed: Jun. 11, 2014

(65) Prior Publication Data

US 2015/0360610 A1 Dec. 17, 2015

(51) Int. Cl.
*G08B 23/00* (2006.01)
*B60Q 9/00* (2006.01)
*B60W 50/00* (2006.01)
*B60W 50/14* (2012.01)
*B60W 30/16* (2012.01)

(52) U.S. Cl.
CPC ......... *B60Q 9/008* (2013.01); *B60W 50/0098* (2013.01); *B60W 50/14* (2013.01); *B60W 30/16* (2013.01); *B60W 2050/0075* (2013.01); *B60W 2050/143* (2013.01); *B60W 2540/04* (2013.01); *B60W 2540/22* (2013.01); *B60W 2540/26* (2013.01); *B60W 2540/28* (2013.01); *B60W 2550/10* (2013.01); *B60W 2550/12* (2013.01);

(Continued)

(58) Field of Classification Search
CPC ........ G01S 13/931; B60Q 1/525; G08B 21/06
USPC ....... 340/903, 436, 435, 933, 935, 936, 937, 340/938, 905, 438, 995, 539.13, 426, 575, 340/576; 701/301
See application file for complete search history.

(56) References Cited

U.S. PATENT DOCUMENTS 5,488,353 A * 1/1996 Kawakami ............. G08B 21/06
340/575
7,421,334 B2 9/2008 Dahlgren et al.
(Continued)

FOREIGN PATENT DOCUMENTS

DE 10219904 A1 4/2004
EP 1347425 B1 9/2003

*Primary Examiner* — George Bugg
*Assistant Examiner* — Munear Akki
(74) *Attorney, Agent, or Firm* — Burgess Law Office, PLLC; Raymond L. Coppiellie

(57) ABSTRACT

Systems and methods for improving vehicle wrong-way detection including systems, sensors or features, such as those for system/network clocks, ambient light, driver impairment, automatic cruise control, blind spot warning or configurable vehicle security, either singly or in any combination therewith, may refine and/or modify the confidence level of detecting particular or potential wrong-way incidents. By modifying the confidence level, the system may change the system sensitivity by moving the cutoff point at which an alert activation takes place. The systems described above can modify the wrong-way detection sensitivity. Greater confidence, or system sensitivity, may also help enable the system to take further actions beyond a simple warning. At greater confidence levels, the system could intervene, by way of a non-limiting example, with throttle limiting, turning on the hazard lights or even bringing the vehicle to a stop.

9 Claims, 4 Drawing Sheets

(52) U.S. Cl.
CPC ..... *B60W 2550/20* (2013.01); *B60W 2550/22* (2013.01)

(56) References Cited

U.S. PATENT DOCUMENTS

| | | | |
|---|---|---|---|
| 7,983,838 B1 | 7/2011 | MIslan | |
| 7,990,286 B2 | 8/2011 | Shankwitz et al. | |
| 8,139,819 B2* | 3/2012 | Morita | A61B 5/18 340/575 |
| 2007/0112476 A1* | 5/2007 | Obradovich | B60R 16/0231 701/1 |
| 2010/0007479 A1* | 1/2010 | Smith | B60W 50/14 340/436 |
| 2010/0033333 A1* | 2/2010 | Victor | A61B 3/113 340/576 |
| 2011/0121992 A1* | 5/2011 | Konaka | B62D 15/029 340/905 |
| 2012/0212353 A1* | 8/2012 | Fung | B60K 28/06 340/905 |
| 2013/0147639 A1 | 6/2013 | Wietfeld et al. | |
| 2014/0097957 A1* | 4/2014 | Breed | G08B 21/06 340/576 |
| 2014/0136044 A1* | 5/2014 | Conrad | B60W 30/09 701/23 |
| 2014/0375462 A1* | 12/2014 | Biondo | A61B 5/18 340/576 |

\* cited by examiner

SYSTEM AND METHOD FOR IMPROVING VEHICLE WRONG-WAY DETECTION

BACKGROUND OF THE INVENTION

1. Field of the Invention

The present invention relates generally to systems and methods for vehicle wrong-way detection; and more particularly, to a system and method for improving vehicle wrong-way detection. The system uses a plurality of vehicle sensors and electronic systems designed to provide information to either the driver or other vehicle systems regarding the driving environment to refine the confidence level of detecting potential wrong-way incidents.

2. Description of Related Art

While wrong-way driving accidents account for a small fraction of the total number of vehicle accidents, they are often fatal. Wrong-way accidents occur more often on freeways, where higher speeds are a factor; during the nighttime and early morning hours; attributed to driving under the influence of alcohol and/or drugs; and often involve young or older drivers.

In recent years, wrong-way detection systems using either the vehicle's navigation system or a forward-looking camera determine if a subject vehicle is traveling in the wrong direction. A global positioning system ("GPS") operates with the vehicle navigation system to ascertain the vehicle's position and determine whether the vehicle is traveling on the wrong side of a freeway. Forward-looking camera systems use a traffic sign recognition ("TSR") algorithm to detect "Do Not Enter" and/or "Wrong Way" signs when a driver attempts to enter a motorway in the wrong direction.

Although these systems can be effective, the respective limitations of each system require they carefully balance wrong-way detection with false warnings. Other factors such as environmental conditions; e.g., day/night, sun load, rain/snow/fog, and/or the like, can also affect system performance.

There exists a need for new and improved systems and methods for improving vehicle wrong-way detection that overcomes the afore-mentioned disadvantages.

SUMMARY OF THE INVENTION

In one embodiment of the present invention systems, sensors or features, such as system/network clocks, ambient light, driver impairment, automatic cruise control, blind spot warning or configurable vehicle security, either singly or in any combination, refine or modify the confidence level of detecting particular or potential wrong-way incidents. By modifying the confidence level, the system may change the system sensitivity by moving the cutoff point at which an alert activation takes place. The systems described above can modify the wrong-way detection sensitivity. Greater confidence, or system sensitivity, enables the system to take further actions beyond a simple warning. At greater confidence levels, the system could intervene with throttle limiting, turning on the hazard lights or even bringing the vehicle to a stop.

For example, the vehicle wrong-way detection system includes an alert system selectively operable to alert a driver of the vehicle that the vehicle is travelling the wrong way on a roadway. A vehicle control system communicating with the alert system may include: a clock subsystem selectively operable to determine a time of day; an ambient light subsystem selectively operable to determine an ambient light level outside of the vehicle; a driver impairment subsystem selectively operable to determine a level of driver impairment; an automatic cruise control subsystem selectively operable to determine if the vehicle is following another vehicle travelling in the same direction; a blind spot warning subsystem selectively operable to determine if another vehicle is in the blind spot of the vehicle; or a configurable vehicle security subsystem selectively operable to determine an identity of the driver of the vehicle. The vehicle control system is selectively operable to either raise or lower of a confidence level or sensitivity level of the alert system based on information from the subsystems causing issuance of the alert either sooner or later than a pre-determined baseline threshold.

In accordance with a first alternative embodiment of the present invention, the vehicle wrong-way detection system may include a vehicle control system selectively operable to either raise or lower of a confidence level or sensitivity level of the alert system to causing issuance of the alert either sooner or later than a pre-determined baseline threshold.

In accordance with a second alternative embodiment of the present invention, the vehicle wrong-way detection system may include a vehicle control system selectively operable to either raise or lower of a confidence level or sensitivity level of the alert system to causing issuance of the alert either sooner or later than a pre-determined baseline threshold. Further, the vehicle control system is selectively operable to modify a performance parameter of the vehicle in response to the alert.

Further areas of applicability of the present invention will become apparent from the detailed description provided. It should be understood that the detailed description and specific examples, while indicating the preferred embodiment of the invention, are intended for illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
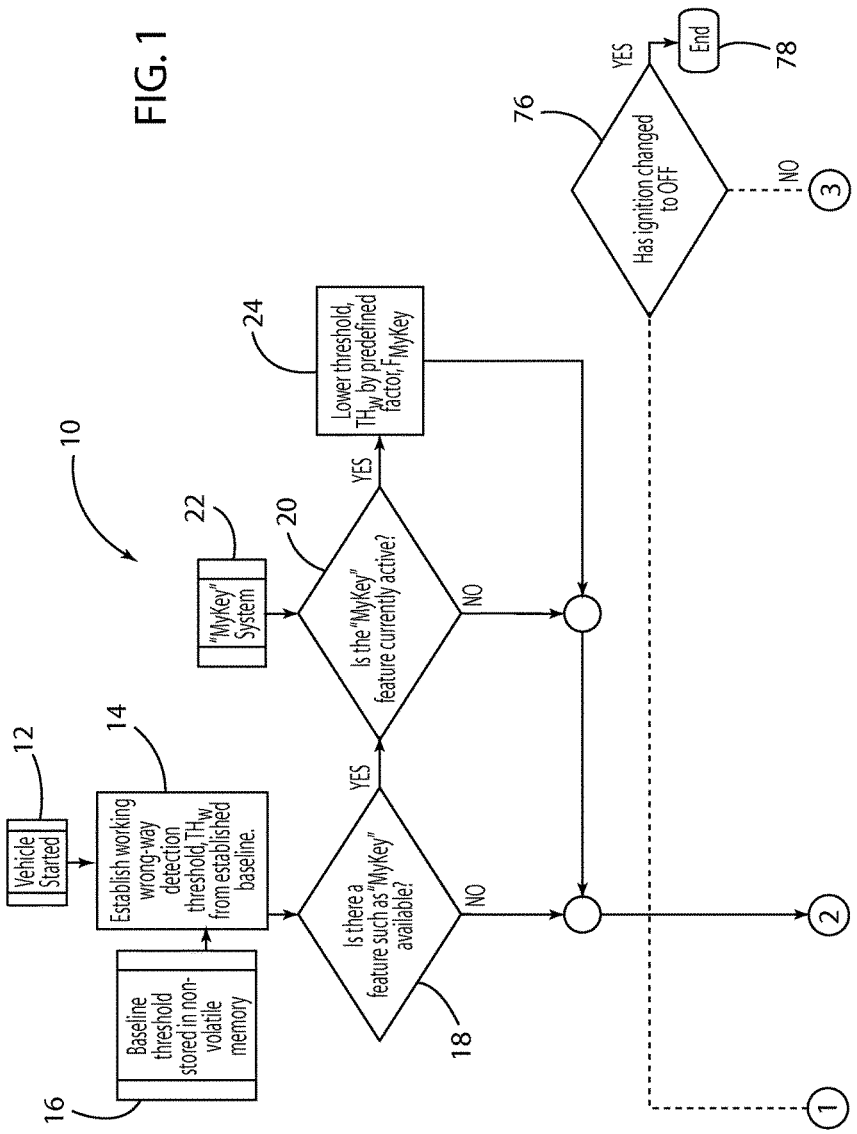
FIG. 1 is part of a flow chart that depicts a schematic view of an illustrative system for improving vehicle wrong-way detection, in accordance with the present invention.

The following description of the preferred embodiment(s) is merely exemplary in nature and is in no way intended to limit the invention, its application, or uses.

Conventional wrong-way detection systems typically make some evaluation of their sensor data to make a determination whether or not the vehicle is traveling the wrong-way on a one-way road. The system weighs the confidence of these measurement cues to estimate the likeliness of a wrong-way scenario being present.

Based on the assessed confidence, there exists some arbitrary cutoff point at which the system acts those confidence levels and ignores those with lower confidence levels. This cutoff point represents a tradeoff between incorrect activation (e.g., false alerts) and missed activation. There is significant variation in environment and road conditions that make setting a relatively hard cutoff limit difficult and somewhat arbitrary.

Today's vehicles are typically outfitted with a plurality of sensors and electronic systems designed to provide information to either the driver or other vehicle systems regarding the driving environment. Systems, such as the ones listed in Table 1 below, are becoming either standard or common options on vehicles today.

TABLE 1

Common features found on conventional vehicles

| System/Sensor/Feature | Function |
|---|---|
| System/Network Clock | Provides time of day, and potentially date information, to other systems over the vehicle network. |
| Ambient Light Sensor | Provides information regarding outside lighting conditions (e.g., day, night, tunnel and/or the like). |
| Driver Impairment Monitors | Monitors driver ability to track lane and equate to impairment (e.g., tiredness and/or the like) level. |
| Automatic Cruise Control | Utilizes forward looking radar, or other sensors, to help maintain a safe distance to leading vehicles while using the cruise control feature. |
| Blind Spot Warning System | Utilizes side radars, or other sensors, to warn the driver if another vehicle is present in their blind spot. |
| "MyKey ®" features | Allows certain vehicle features to be customized based on who is driving, as determined by the ignition key that is used. For example, it is typically utilized to provide limits on young drivers (e.g., teenagers). |

The MyKey® feature is a motor vehicle security system designed by the Ford Motor Company that controls use of a vehicle with a configurable key. The technology targets parents who wish to share their car with adolescent or young adult drivers. Keys may be configured with a variety of settings including: (1) speed control gives the owner the ability to limit the top speed to 80 mph; (2) volume control allows the owner to adjust the volume of the radio remotely; (3) a "beltminder" reminds the driver to buckle their seat belt by muting the vehicle's radio and chiming for six seconds every minute for five minutes; and (4) additional features such as an earlier fuel reminder and a speed reminder chime at 45, 55 or 65 mph.

These features, either singly or in any combination, combined with what is known about the characteristics of wrong-way driving events may refine or modify the confidence level of detecting particular or potential wrong-way incidents. Modifying system confidence level changes system sensitivity by moving the cutoff point at which an alert activation takes place. The systems described above can modify the wrong-way detection sensitivity in the ways listed in Table 2, below. Greater confidence, or system sensitivity, helps the system to take further actions beyond a simple warning. At greater confidence levels, the system could intervene with throttle limiting, turning on the hazard lights or even bringing the vehicle to a stop.

TABLE 2

System sensitivity modification based on secondary sensor inputs

| System/Sensor/Feature | Sensor Identified Data | System Sensitivity Impact | Wrong-Way Characteristic Link |
|---|---|---|---|
| System/Network Clock | Time of day: Nighttime vehicle operation (e.g., 12:00 am-6:00 am, especially 2:00 am-3:00 am) | Increase Sensitivity (e.g., lower activation threshold) | Addresses the statistically likely time that wrong-way incidents are most likely to happen. |
| Ambient Light Sensor | Nighttime vehicle operation | Same as above, but possibly a lower confidence. | Same as above |
| Driver Impairment Monitors | Impaired driving | Increase Sensitivity (e.g., lower activation threshold) | Address the statistical likelihood that DUI and inattentive/drowsy driving strongly contribute to wrong-way incidents |
| "MyKey" Features | Are vehicle limitations currently in effect indicating that a young or other at risk driver is currently operating the vehicle? | Increase Sensitivity (e.g., lower activation threshold) | Address the statistical likelihood that younger drivers are more likely to be involved in a wrong-way incident. |
| Automatic Cruise Control | Trailing a leading vehicle (e.g., the system has detected that the vehicle is following another vehicle traveling in the same direction) | Decrease Sensitivity (e.g., raise activation threshold) | n/a |
| Blind Spot Warning System | Vehicles have been detected in the subject vehicle blind spot, especially if they have stagnated there for more than a brief moment. | Decrease Sensitivity (e.g., raise activation threshold) | n/a |

FIGS. 1-4 illustrates an example of how these inputs may be monitored to modify (e.g., via an algorithm and/or the like) the wrong-way detection sensitivity of a vehicle's control system.

Turning first to FIG. 1, a vehicle wrong-way detection system is shown at 10. At step 12, the system 10 initiates upon vehicle startup. Once initiated, the system 10, at step 14, establishes a working wrong-way detection threshold, $TH_W$, from an existing or pre-set baseline. The baseline threshold can be stored in the non-volatile memory of the vehicle's main computer system and/or subsystem 16.

Upon establishing the working wrong-way detection threshold, $TH_W$, a decision node 18 queries whether a feature such as a MyKey® feature, e.g., as previously described, is present and/or available. If the answer is yes, then a decision node 20 queries whether the MyKey® feature is active. By way example, a MyKey® system controls the MyKey® feature, at subsystem 22. If the answer is yes, then the working wrong-way detection threshold, $TH_W$, may be lowered, e.g., by a pre-determined or pre-defined factor, $F_{MyKey}$, at step 24. As set forth above, one example includes a factor increasing system sensitivity, resulting in a lower activation threshold, if an at risk driver is operating the vehicle.

Figure 2:
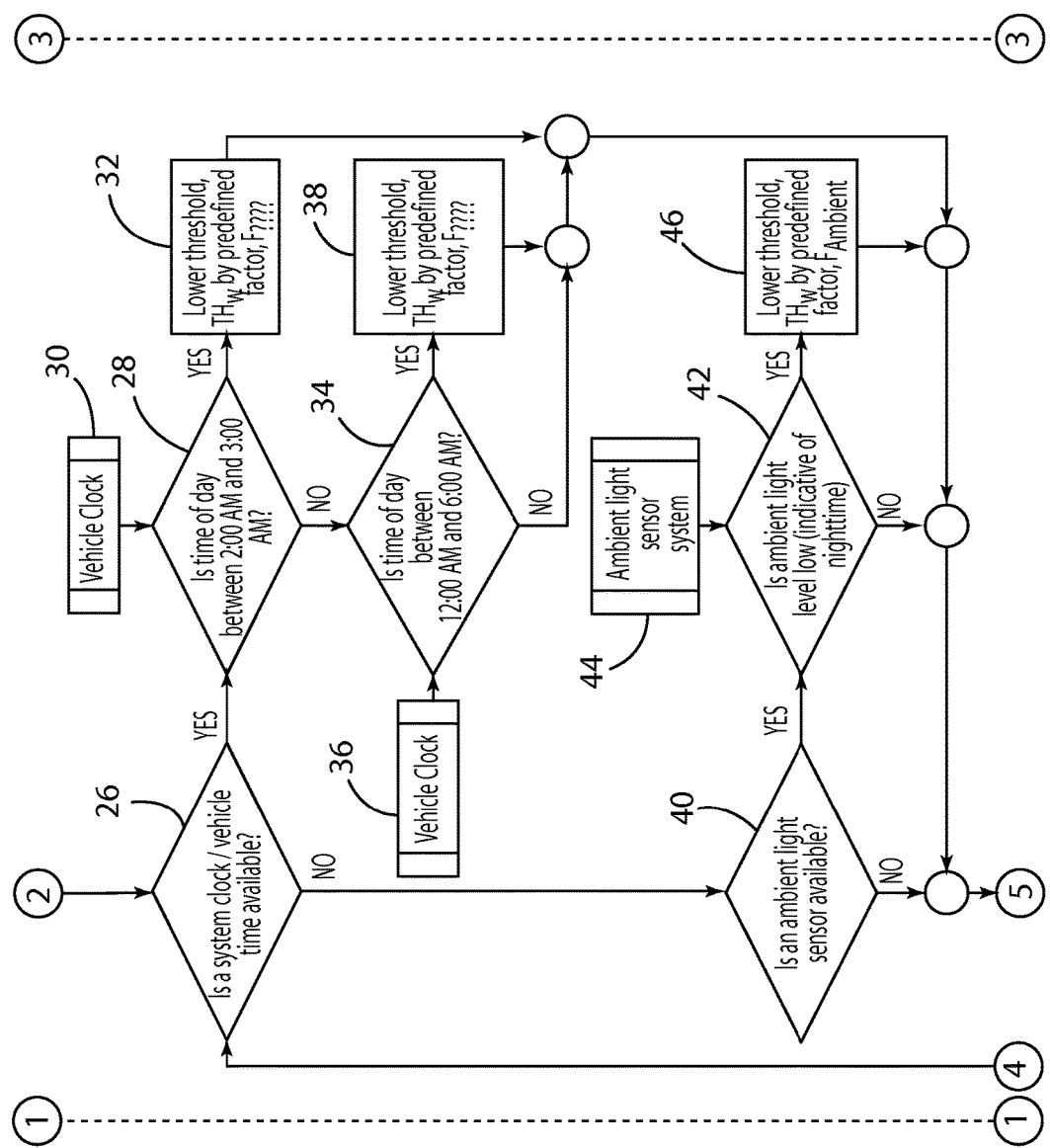
FIG. 2 is a flowchart continued from the flowchart of FIG. 1.

Referring now to FIG. 2, FIG. 2 is a flowchart continued from the flowchart of FIG. 1 with connectors "1", "2" and "3" illustrating the flow path between FIG. 1 and FIG. 2. If the answer to decision nodes 18 or 20 of FIG. 1 is no, then a decision node 26 queries whether a system clock/vehicle time is available. If the answer is yes, then a decision node 28 queries whether the time of day is between 2:00 a.m. and 3:00 a.m. (it should be appreciated these times may be changed or modified to include a larger (or smaller) time range). The vehicle clock feature can be controlled by a vehicle clock system, at subsystem 30. If the answer is yes, then the working wrong-way detection threshold, $TH_W$, may be lowered, e.g., by a pre-determined or pre-defined factor, $F_{ToDHi}$, at step 32

If the answer to decision node 28 is no, then a decision node 34 queries whether the time of day is between 12:00 a.m. and 6:00 a.m. (it should be appreciated these times may be changed or modified to include a larger (or smaller) time range). Again, the vehicle clock feature can be controlled by a vehicle clock system, at subsystem 36. If the answer is yes, then the working wrong-way detection threshold, $TH_W$, may be lowered, e.g., by a pre-determined or pre-defined factor, $F_{ToDLo}$, at step 38.

If the answer to decision node 26 is no, then a decision node 40 queries whether an ambient light sensor is available. If the answer is yes, then a decision node 42 queries whether the ambient light level is low (e.g., indicative of nighttime). The ambient light sensor can be controlled by an ambient light sensor system, at subsystem 44. If the answer is yes, then the working wrong-way detection threshold, $TH_W$, may be lowered, e.g., by a pre-determined or pre-defined factor, $F_{Ambient}$, at step 46. As set forth above, one example includes a factor increasing system sensitivity, resulting in a lower activation threshold, if the vehicle is being driven during nighttime hours.

Figure 3:
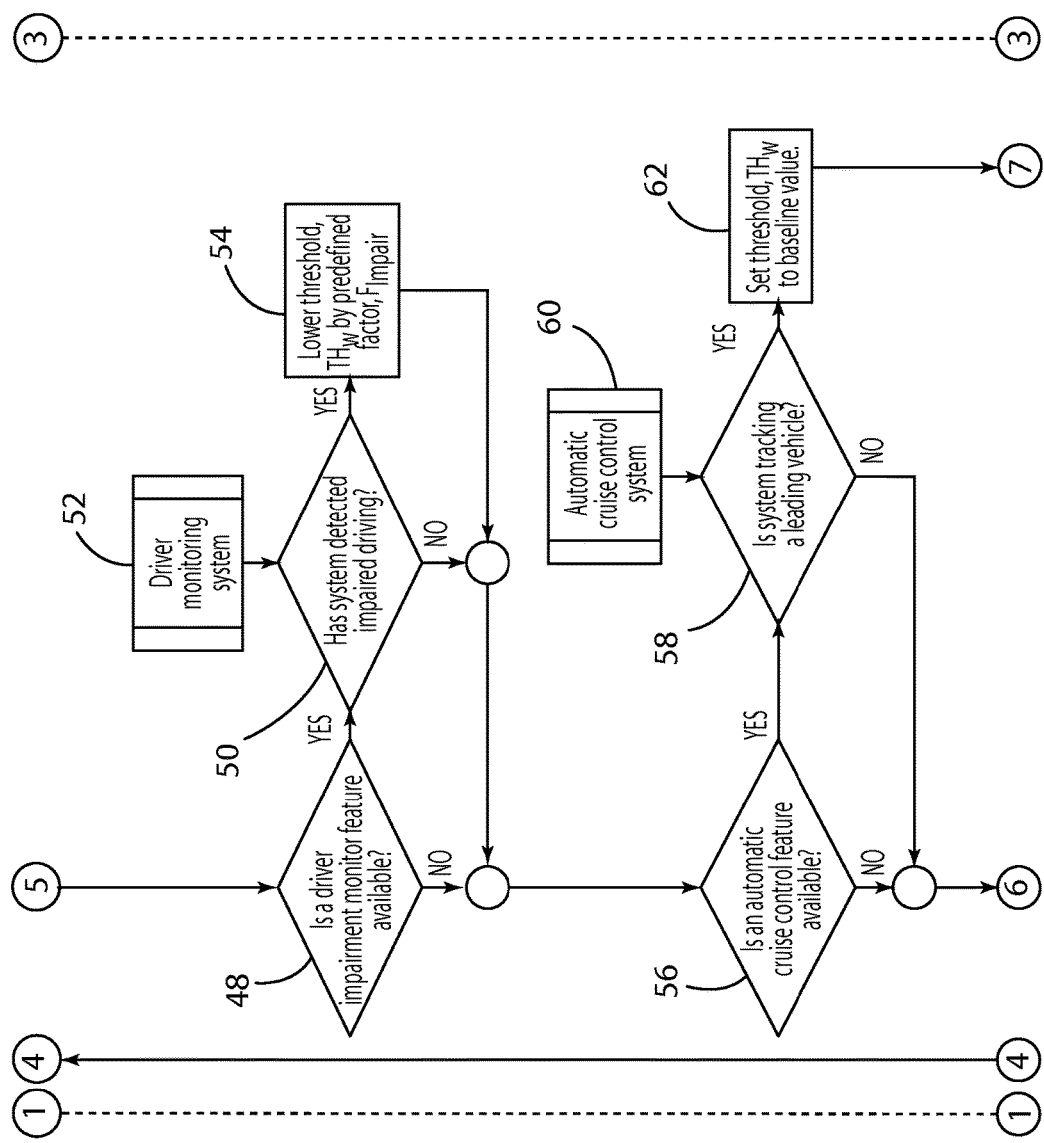
FIG. 3 is a flowchart continued from the flowchart of FIG. 2.

Referring now to FIG. 3, FIG. 3 is a flowchart continued from the flowchart of FIG. 3 with connectors "1", "3", "4" and "5" illustrating the flow path between FIG. 2 and FIG. 3. If the answer to decision nodes 34, 40 or 42 is no, then a decision node 48 queries whether a driver impairment monitor feature is available. If the answer is yes, then a decision node 50 queries whether the feature has detected impaired driving. A driver monitoring system, at subsystem 52, can control the driver monitoring feature. If the answer is yes, then the working wrong-way detection threshold, $TH_W$, may be lowered, e.g., by a pre-determined or pre-defined factor, $F_{Impair}$, at step 54. As set forth above, one example includes a factor increasing system sensitivity, resulting in a lower activation threshold, if the driver appears to be impaired.

If the answer to decision nodes 48 or 50 is no, then a decision node 56 queries whether an automatic cruise control feature is available. If the answer is yes, then a decision node 58 queries whether the feature is tracking a leading vehicle. An automatic cruise control system, at subsystem 60, controls the automatic cruise control feature. If the answer is yes, then the working wrong-way detection threshold, $TH_W$, may be set to a baseline value, at step 62. As set forth above, the system sensitivity is set to a baseline default if it appears that the vehicle is traveling in the correct direction.

Figure 4:
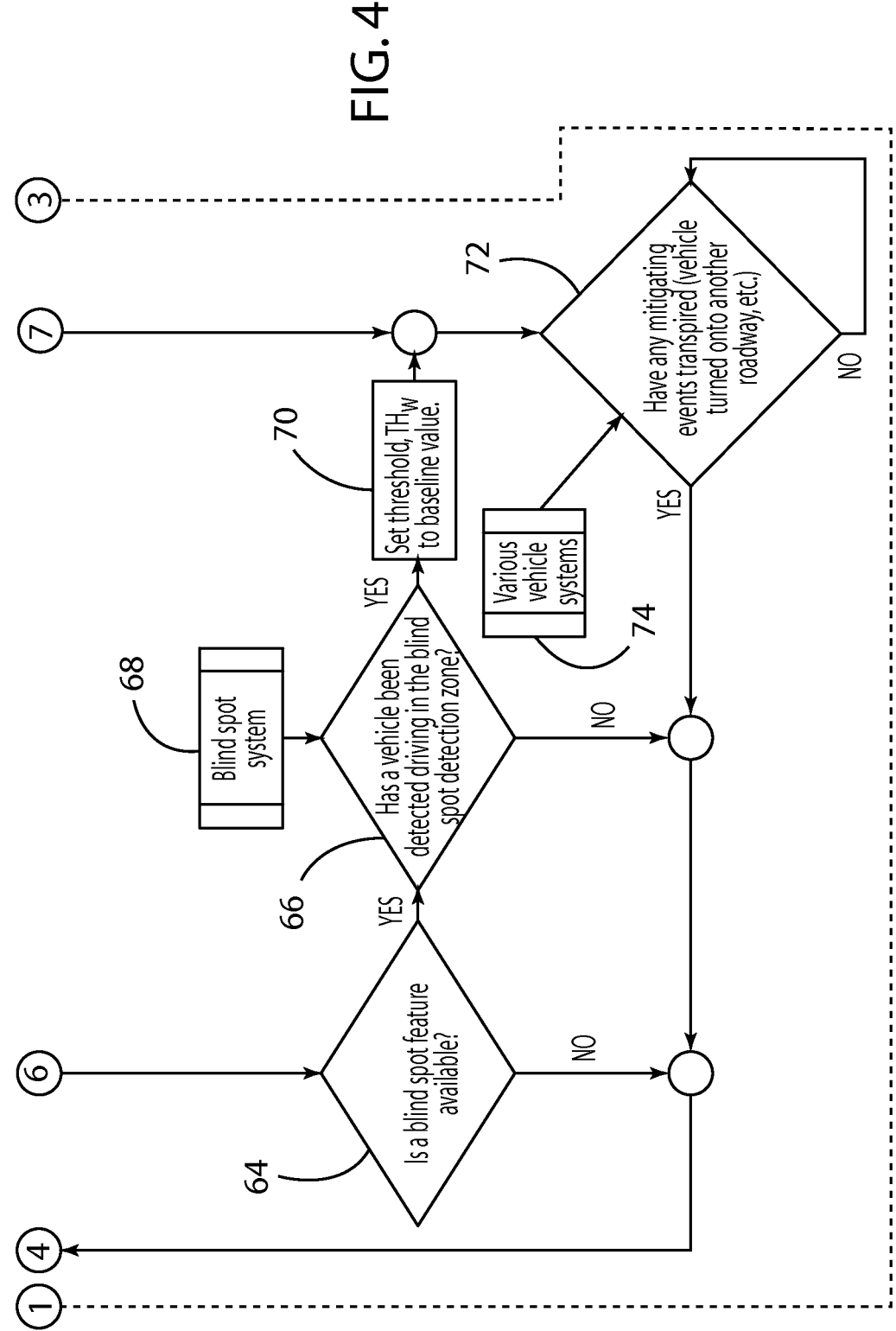
FIG. 4 is a flowchart continued from the flowchart of FIG. 3.

Referring now to FIG. 4, FIG. 4 is a flowchart continued from the flowchart of FIG. 3 with connectors "1", "3", "4", "6" and "7" illustrating the flow path between FIG. 3 and FIG. 4. If the answer to decision nodes 56 or 58 is no, then a decision node 64 queries whether a blind spot feature is available. If the answer is yes, then a decision node 66 queries whether a vehicle has been detected driving in the blind spot detection zone. A blind spot control, at subsystem 68, controls the blind spot feature. If the answer is yes, then the threshold, $TH_W$, may be set to a baseline value, at step 70

If the answer to decision nodes 64 or 66 is no, the system 10 will then cycle back to decision node 26 and may repeat one or more of the above-described processes.

Optionally, another decision node 72, in communication with steps 62 and/or 70, queries whether any mitigating events may have transpired (e.g., has the vehicle turned onto another roadway and/or the like). The mitigating event feature can be controlled by a various vehicle systems, at subsystem 74. If the answer to decision node 72 is no, the system 10 cycles back to decision node 72 and may repeat the above-described process. If the answer to decision node 72 is yes, the system 10 cycles back to decision node 26 and may repeat one or more of the above-described processes.

Optionally, another decision node 76, in communication with one or more of the above-described systems, subsystems, features, steps, processes, or the like, queries whether the ignition has changed to the OFF position (i.e., has the vehicle been turned off). If the answer to decision node 76 is yes (i.e., the car is no longer running), the system 10 will end the above-described routine, at step 78. If the answer to decision node 76 is no (i.e., the car is still running), the system 10 will continue to run the above-described routine.

Number, types, order or the communication paths between or among the above-described systems, subsystems, features, steps, processes or the like may be altered or modified without departing from the scope of the present invention.

In some applications, the present invention may be provided as elements of an integrated software system, in which the features may be provided as separate elements of a computer program. Some embodiments may be implemented using a computer-readable storage medium (e.g., non-transitory) or article which may store an instruction or a set of instructions that, if executed by a processor, may cause the processor to perform a method in accordance with the embodiments. Other applications of the present invention may be embodied as a hybrid system of dedicated hardware and software components. Not all of the features described above need be provided or need be provided as separate units. The arrangement of the features does not imply an order or sequence of events, nor are they intended to exclude other possibilities. The features may occur in any order or substantially simultaneously with each other. Such implementation details are immaterial to the operation of the present invention unless otherwise noted above.

The exemplary methods and computer program instructions may be embodied on a computer readable storage medium (e.g., non-transitory) that may include any medium that can store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. A server or database server may include computer readable media configured to store executable program instructions. The features of the embodiments of the present invention may be implemented in hardware, software, firmware or a combination and utilized in systems, subsystems, components or subcomponents.

A software program embodying the features of the present invention may be used with a computer device. Examples of a computing device may include an automotive vehicle computer system, an electronic book reading device, a computer workstation, a terminal computer, a server computer, a handheld device (e.g., a tablet computer, a personal digital assistant "PDA", a mobile telephone, a Smartphone, etc.), a web appliance, a network router, a network switch, a network bridge, any machine capable of executing a sequence of instructions that specify an action to be taken by that machine or any combinations.

The computer device may also include an input device. In one example, a user of the computer device may enter commands and/or other information into computer device via an input device. Examples of an input device may include an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen or any combinations. The input device may be interfaced to a bus via a variety of interfaces including a serial interface, a parallel interface, a game port, a USB interface, a FIREWIRE interface, a direct interface to a bus, and any combinations. The input device may include a touch screen interface that may be a part of or separate from the display.

A user may also input commands and/or other information to the computer device via a storage device (e.g., a removable disk drive, a flash drive, etc.) and/or a network interface device. A network interface device may connect the computer device to one or more of a variety of networks or one or more remote devices. Examples of a network interface device may include a network interface card (e.g., a mobile network interface card, a LAN card), a modem, and any combination. Examples of a network may include a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices or any combinations. A network may employ a wired or a wireless mode of communication. Any network topology may be used. Information (e.g., data, software, etc.) may be communicated to or from the computer device via a network interface device.

The computer device may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations. Besides a display device, the computer device may include one or more other peripheral output devices including, but not limited to, an audio speaker, a printer, and any combinations. Such peripheral output devices may connect to a bus via a peripheral interface. Examples of a peripheral interface may include a serial port, a USB connection, a FIREWIRE connection, a parallel connection or any combinations.

Ways to accomplish implementation of the above-described system include a computer-implemented system or method configured to carry out a specific sequence of steps or procedures to accomplish a specific sequence of functions or features. As set forth above, FIG. 1 shows an illustrative flowchart depicting the primary processing steps for carrying out one or more embodiments of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle wrong-way detection system, comprising:
   an alert system selectively operable to alert a driver of the vehicle that the vehicle is travelling the wrong way on a roadway;
   a vehicle control system in communication with the alert system, the vehicle control system including at least two of the following vehicle subsystems:
      a clock subsystem selectively operable to determine a time of day;
      an ambient light subsystem selectively operable to determine an ambient light level outside of the vehicle;
      a driver impairment subsystem selectively operable to monitor vehicle lane tracking and based thereon determine a level of driver impairment;
      an automatic cruise control subsystem selectively operable to determine if the vehicle is following another vehicle travelling in the same direction;
      a blind spot warning subsystem selectively operable to determine if another vehicle is in the blind spot of the vehicle; and
      a configurable vehicle security subsystem selectively operable to determine an identity of the driver of the vehicle;
   wherein the vehicle control system is selectively operable to either raise or lower a confidence level or sensitivity level of the alert system to cause the alert to be issued either sooner or later than a pre-determined baseline threshold based on said vehicle subsystem determinations and without monitoring driver action.

2. The vehicle wrong-way detection system according to claim 1, wherein the vehicle control system is selectively operable to either raise or lower a cutoff point of the alert system to cause the alert to be issued either sooner or later than a pre-determined baseline threshold.

3. The vehicle wrong-way detection system according to claim 1, wherein the vehicle control system is selectively operable to modify vehicle operation independent of driver input in response to the alert.

4. The vehicle wrong-way detection system according to claim 1, wherein the vehicle control system is selectively operable to modify a performance parameter of the vehicle selected from the group consisting of limiting of a throttle position of the vehicle, turning on a hazard light of the vehicle, bringing the vehicle to a stop and combinations thereof independent of driver input.

5. A vehicle wrong-way detection system, comprising:
   an alert system selectively operable to alert a driver of the vehicle that the vehicle is travelling the wrong way on a roadway;
   a vehicle control system in communication with the alert system, the vehicle control system including at least two of the following vehicle subsystems:
      a clock subsystem selectively operable to determine a time of day;
      an ambient light subsystem selectively operable to determine an ambient light level outside of the vehicle;

a driver impairment subsystem selectively operable to monitor vehicle lane tracking and based thereon to determine a level of driver impairment;

an automatic cruise control subsystem selectively operable to determine if the vehicle is following another vehicle travelling in the same direction;

a blind spot warning subsystem selectively operable to determine if another vehicle is in the blind spot of the vehicle; and a configurable vehicle security subsystem selectively operable to determine an identity of the driver of the vehicle;

wherein the vehicle control system is selectively operable to either raise or lower a confidence level or sensitivity level of the alert system to cause the alert to be issued either sooner or later than a pre-determined baseline threshold based on said vehicle subsystem determinations and without monitoring driver action.

6. The vehicle wrong-way detection system according to claim 5, wherein the vehicle control system is selectively operable to either raise or lower a cutoff point of the alert system to cause the alert to be issued either sooner or later than a pre-determined baseline threshold.

7. The vehicle wrong-way detection system according to claim 5, wherein the vehicle control system is selectively operable to modify vehicle operation independent of driver input in response to the alert.

8. The vehicle wrong-way detection system according to claim 5, wherein the vehicle control system is selectively operable to modify a performance parameter of the vehicle selected from the group consisting of limiting of a throttle position of the vehicle, turning on a hazard light of the vehicle, bringing the vehicle to a stop and combinations thereof independent of driver input.

9. A vehicle wrong-way detection system, comprising:

an alert system selectively operable to alert a driver of the vehicle that the vehicle is travelling the wrong way on a roadway;

a vehicle control system in communication with the alert system, the vehicle control system including:

a clock subsystem selectively operable to determine a time of day;

an ambient light subsystem selectively operable to determine an ambient light level outside of the vehicle;

a driver impairment subsystem selectively operable to determine a level of driver impairment;

an automatic cruise control subsystem selectively operable to determine if the vehicle is following another vehicle travelling in the same direction;

a blind spot warning subsystem selectively operable to determine if another vehicle is in the blind spot of the vehicle; and a configurable vehicle security subsystem selectively operable to determine an identity of the driver of the vehicle;

wherein the vehicle control system is selectively operable to either raise or lower a confidence level or sensitivity level of the alert system to cause the alert to be issued either sooner or later than a pre-determined baseline threshold;

wherein the vehicle control system is selectively operable to either raise or lower a cutoff point of the alert system to cause the alert to be issued either sooner or later than a pre-determined baseline threshold;

wherein the vehicle control system is selectively operable to modify a performance parameter of the vehicle in response to the alert;

wherein the performance parameter of the vehicle is selected from the group consisting of limiting of a throttle position of the vehicle, turning on a hazard light of the vehicle, bringing the vehicle to a stop and combinations thereof based on at least two of said vehicle subsystem determinations and independent of driver input.

* * * * *